US011939437B2

(12) United States Patent
Suzuki

(10) Patent No.: US 11,939,437 B2
(45) Date of Patent: Mar. 26, 2024

(54) METHOD FOR PRODUCING FIBER FOR REINFORCING RUBBER

(71) Applicant: TEIJIN FRONTIER CO., LTD., Osaka (JP)

(72) Inventor: Yoshifumi Suzuki, Osaka (JP)

(73) Assignee: TEIJIN FRONTIER CO., LTD., Osaka (JP)

( * ) Notice: Subject to any disclaimer, the term of this patent is extended or adjusted under 35 U.S.C. 154(b) by 386 days.

(21) Appl. No.: 17/416,672

(22) PCT Filed: Dec. 17, 2019

(86) PCT No.: PCT/JP2019/049291
§ 371 (c)(1),
(2) Date: Jun. 21, 2021

(87) PCT Pub. No.: WO2020/129939
PCT Pub. Date: Jun. 25, 2020

(65) Prior Publication Data
US 2022/0073687 A1  Mar. 10, 2022

(30) Foreign Application Priority Data

Dec. 20, 2018  (JP) ................. 2018-238026

(51) Int. Cl.
*C08J 5/06* (2006.01)
*C08J 5/24* (2006.01)
*C08L 25/18* (2006.01)
*C08L 75/14* (2006.01)
*D06M 15/564* (2006.01)
*D06M 15/693* (2006.01)

(52) U.S. Cl.
CPC ............... *C08J 5/06* (2013.01); *C08J 5/246* (2021.05); *C08L 25/18* (2013.01); *C08L 75/14* (2013.01); *D06M 15/564* (2013.01); *D06M 15/693* (2013.01); *C08J 2325/18* (2013.01); *C08J 2375/14* (2013.01); *C08J 2425/18* (2013.01); *C08J 2475/14* (2013.01); *C08L 2203/12* (2013.01); *C08L 2205/03* (2013.01); *C08L 2207/04* (2013.01)

(58) Field of Classification Search
CPC .................... C08J 5/06; C08J 5/246
See application file for complete search history.

(56) References Cited

U.S. PATENT DOCUMENTS

| | | | |
|---|---|---|---|
| 6,177,508 B1 * | 1/2001 | Ohmori | C08G 18/10 528/45 |
| 6,179,008 B1 * | 1/2001 | Kawazura | C08L 67/02 138/125 |
| 6,453,960 B1 * | 9/2002 | Kondo | F16G 1/08 428/521 |
| 10,487,447 B2 | 11/2019 | Cevahir et al. | |
| 2003/0027920 A1 * | 2/2003 | Kinoshita | F16G 5/20 524/508 |
| 2005/0129943 A1 * | 6/2005 | Ando | D06M 15/41 428/375 |
| 2010/0023981 A1 * | 1/2010 | Creamer | H04N 23/661 725/105 |
| 2010/0136332 A1 * | 6/2010 | Murayama | D06M 15/263 428/367 |
| 2010/0221520 A1 * | 9/2010 | Tai | D06M 11/77 428/296.4 |
| 2010/0239810 A1 * | 9/2010 | Bhatnagar | F41H 5/0478 156/196 |
| 2012/0041113 A1 * | 2/2012 | Ikeda | C08L 9/08 524/114 |
| 2014/0093729 A1 * | 4/2014 | Furusawa | F16G 5/20 523/205 |
| 2015/0051343 A1 * | 2/2015 | Kaplan | C08J 5/06 524/745 |
| 2015/0167232 A1 | 6/2015 | Manabe et al. | |
| 2015/0183966 A1 * | 7/2015 | Weimar | C09J 101/14 106/170.2 |
| 2015/0369336 A1 * | 12/2015 | Katagiri | C08L 15/005 428/367 |
| 2017/0029578 A1 * | 2/2017 | Wu | D06M 15/564 |
| 2018/0297407 A1 * | 10/2018 | Nakamura | B60C 9/005 |

FOREIGN PATENT DOCUMENTS

| | | | |
|---|---|---|---|
| CN | 106460313 A | 2/2017 | |
| EP | 1285936 A2 * | 8/2002 | ............ C08G 18/08 |
| JP | 9-21073 A | 1/1997 | |
| JP | 10-273880 A | 10/1998 | |

(Continued)

OTHER PUBLICATIONS

Su, Qiang, et al., "Mechanical Properties of Hybrid Fiber Reinforced Rubber Concrete". Materials, 2021, 14, 6028, pp. 1-13.*
Patil, Yogesh, et al., "Effect of coir fiber reinforcement on mechanical properties of vulcanized natural rubber composites". Science and Engineering of Composite Materials, 2018; 25(3): 517-528.*
O'Connor, J.E., et al., "Short-Fiber-Reinforced Elastomer Composites". Rubber Chemistry and Technology (1977) 50 (5): 945-958.*
Speri, William M., et al., "Fiber Reinforced Rubber Modified Polypropylene". Polymer Engineering and Science, Sep. 1975, vol. 15, No. 9, pp. 668-672.*
Laura, D.M., et al., "Effect of glass fiber surface chemistry on the mechanical properties of glass fiber reinforced, rubber-toughened nylon 6". Polymer 43 (2002) 4673-4687.*

(Continued)

Primary Examiner — Bret P Chen
(74) Attorney, Agent, or Firm — Sughrue Mion, PLLC

(57) ABSTRACT

A method for producing a fiber for reinforcing rubber, comprising applying an adhesion treatment liquid containing a thermoplastic elastomer, a blocked polyisocyanate, and a rubber latex to a fiber cord to obtain a fiber for reinforcing rubber, wherein the thermoplastic elastomer is incorporated in the form of a water dispersion into the adhesion treatment liquid, wherein the thermoplastic elastomer particles in the water dispersion have an average particle diameter of 0.01 to 1.0 μm.

5 Claims, No Drawings

(56) References Cited

FOREIGN PATENT DOCUMENTS

| JP | 2002-071057 | A | | 3/2002 | | |
|---|---|---|---|---|---|---|
| JP | 2005-89679 | A | | 4/2005 | | |
| JP | 2005-089929 | A | | 4/2005 | | |
| JP | 2005-213412 | A | | 8/2005 | | |
| JP | 2006-037251 | A | | 2/2006 | | |
| JP | 2006-169683 | | * | 6/2006 | ......... | D06M 15/693 |
| JP | 2006-214013 | A | * | 8/2006 | ......... | D06M 13/352 |
| JP | 2011-236534 | A | | 11/2011 | | |
| JP | 2014-118470 | A | | 6/2014 | | |
| WO | WO 2012/132975 | A1 | * | 10/2012 | ............ | D06M 15/55 |

OTHER PUBLICATIONS

Sae-Oui, Pongdhorn, et al., "Properties and recyclability of thermoplastic elastomer prepared from natural rubber powder (NRP) and high density polyethylene (HDPE)". Polymer Testing 29 (2010) 346-351.*
International Preliminary Report on Patentability with Written Opinion dated Jun. 16, 2021 in International Application No. PCT/JP2019/049291.
European Search Report dated Jan. 28, 2022 in European Application No. 19898928.7.
Communication dated Jan. 27, 2022 from the Indian Patent Office in Indian Application No. 202117029787.
Office Action dated Oct. 26, 2022 in Chinese Application No. 201980084524.4.
International Search Report for PCT/JP2019/049291 dated Mar. 10, 2020 [PCT/ISA/210].

* cited by examiner

METHOD FOR PRODUCING FIBER FOR REINFORCING RUBBER

CROSS REFERENCE TO RELATED APPLICATIONS

This application is a National Stage of International Application No. PCT/JP2019/049291 filed Dec. 17, 2019, claiming priority based on Japanese Patent Application No. 2018-238026 filed Dec. 20, 2018.

TECHNICAL FIELD

The present invention relates to a method for producing a fiber for reinforcing rubber, more particularly relates to a method for producing a fiber for reinforcing rubber, which does not use any of resorcin, formalin, and a condensation compound of resorcin and formalin in the production process.

BACKGROUND ART

Synthetic fibers and inorganic fibers have excellent physical properties, such as a high strength and a high Young's modulus. Therefore, inorganic fibers are widely used in the application of reinforcement for tire, hose, and belt which are made of a rubber. The surface of synthetic fibers and inorganic fibers is generally relatively inert, and, when a synthetic fiber or an inorganic fiber is used as such in reinforcement, the fiber has unsatisfactory adhesion with a rubber, a resin, or the like that is used as a matrix, so that inherent excellent physical properties of the synthetic fiber or inorganic fiber cannot be satisfactorily exhibited.

For removing such a disadvantage, there have been proposed a so-called one-bath adhesion treatment method in which the surface of a fiber is treated with a resorcin-formalin-rubber latex (RFL), and a so-called two-bath adhesion treatment method in which the surface of a fiber is first treated with a polyepoxide compound, and then treated with a resorcin-formalin-rubber latex (RFL), and these methods have been put into practical use. However, with respect to resorcin and formalin used in these methods, in recent years, there is a concern about adverse effects on the environment and human body.

DISCLOSURE OF INVENTION

Technical Problem

A task of the present invention is to provide a fiber for reinforcing rubber, which exhibits excellent bonding force, despite using none of resorcin, formalin, and a condensation compound of resorcin and formalin in the production process for the fiber.

Solution to Problem

Specifically, the present invention is directed to a method for producing a fiber for reinforcing rubber, wherein the method comprises applying an adhesion treatment liquid containing a thermoplastic elastomer, a blocked polyisocyanate, and a rubber latex to a fiber cord to obtain a fiber for reinforcing rubber, wherein the thermoplastic elastomer is incorporated in the form of a water dispersion into the adhesion treatment liquid, wherein the thermoplastic elastomer particles in the water dispersion have an average particle diameter of 0.01 to 1.0 µm.

Advantageous Effects of Invention

By the present invention, there can be provided a fiber for reinforcing rubber, which exhibits excellent bonding force, despite using none of resorcin, formalin, and a condensation compound of resorcin and formalin in the production process for the fiber.

DESCRIPTION OF EMBODIMENTS

[Thermoplastic Elastomer]

The thermoplastic elastomer is a thermoplastic resin having a hard segment and a soft segment. Examples of thermoplastic elastomers include a styrene elastomer, an olefin elastomer, a vinyl chloride elastomer, an urethane elastomer, an ester elastomer, and an amide elastomer. Of these, preferred is an urethane elastomer, and further preferred is an urethane elastomer having a polyurethane as a hard segment and having an aliphatic polyester, an aliphatic polyether, or a polyolefin as a soft segment.

From the viewpoint of obtaining excellent reactivity with a reactive functional group on the rubber or fiber, the thermoplastic elastomer preferably has in the hard segment any one of a phenol group, a hydroxyl group, an amino group, and a carboxyl group as a substituent.

When a polyurethane is used as the hard segment, the polyurethane preferably has any one of a phenolic hydroxyl group, a hydroxyl group, an amino group, and a carboxyl group as a substituent. In this case, the above substituent reacts with an isocyanate group of the blocked polyisocyanate, making it possible to achieve higher adhesion.

As the soft segment, a polyolefin is preferred, and especially, butadiene or isoprene is preferred, and butadiene is further preferred. Such a soft segment can be covulcanized with the rubber component, making it possible to obtain a strong bonding force.

In the invention, the thermoplastic elastomer is especially preferably a copolymer of polyurethane and polybutadiene.

The thermoplastic elastomer is incorporated in the form of a water dispersion into the adhesion treatment liquid.

The thermoplastic elastomer particles in the water dispersion have an average particle diameter of 0.01 to 1.0 µm, preferably 0.02 to 0.8 µm. When the average particle diameter of the thermoplastic elastomer particles is less than 0.01 µm, the film formed from the resultant treatment liquid has poor cohesive force, and, when the average particle diameter is more than 1.0 µm, the water dispersion becomes unstable.

The water dispersion of the thermoplastic elastomer incorporated into the adhesion treatment liquid preferably has a pH of 6 to 8. When the pH of the water dispersion is less than 6, the water dispersion disadvantageously becomes unstable, and, when the pH is more than 8, the water dispersion disadvantageously becomes unstable.

The water dispersion of the thermoplastic elastomer incorporated into the adhesion treatment liquid preferably has a viscosity of 100 to 800 mPa·s (20° C.), further preferably 200 to 750 mPa·s (20° C.). When the viscosity of the water dispersion is less than 100 mPa·s (20° C.), the amount of the adhesion treatment liquid applied to the fiber is disadvantageously reduced, and, when the viscosity is more than 800 mPa·s (20° C.), the dispersion disadvantageously becomes poor in stability.

[Blocked Polyisocyanate]

With respect to the blocked polyisocyanate, an addition reaction product of a polyisocyanate compound and a blocking agent is used. Heating this reaction product causes the blocked component to be liberated, forming an active polyisocyanate compound.

Examples of polyisocyanate compounds include polyisocyanates, such as tolylene diisocyanate, metaphenylene diisocyanate, diphenylmethane diisocyanate, hexamethylene diisocyanate, tris(hexamethylene diisocyanate), a polycondensation product bonded in a chain form using an isocyanate group of tris(hexamethylene diisocyanate), polymethylene polyphenyl isocyanate, and triphenylmethane triisocyanate.

Examples of blocking agents include blocking agents having at least one active hydrogen atom, e.g., phenols, such as phenol, thiophenol, cresol, and resolcinol; aromatic secondary amines, such as diphenylamine and xylidine; cyclic amines, such as pyrazole and dimethylpyrazole; phthalimides; lactams, such as caprolactam and valerolactam; oximes, such as acetoxime, methyl ethyl ketoxime, and cyclohexanone oxime; and acidic sodium sulfite.

The blocked polyisocyanate preferably has two or more blocked isocyanate components per molecule.

The blocked polyisocyanate is incorporated in the form of a water dispersion into the adhesion treatment liquid.

[Rubber Latex]

Examples of rubber latexes include a natural rubber latex, a styrene-butadiene copolymer latex, a vinylpyridine-styrene-butadiene terpolymer latex (hereinafter, frequently referred to as "Vp latex"), a nitrile rubber latex, a chloroprene rubber latex, and an ethylene-propylene-diene monomer latex. These may be used individually or in combination. For further improving the adhesion with a rubber, a rubber latex modified with a functional group may be used. Further, for improving the rubber latex in heat resistance, a rubber latex having a hydrogen atom added thereto may be used.

The rubber latex is incorporated in the form of a water dispersion into the adhesion treatment liquid.

The rubber latex particles in the water dispersion preferably have an average particle diameter of 0.01 to 1.0 μm, further preferably 0.02 to 0.8 μm. The smaller average particle diameter of the rubber latex particles is advantageous to the practice of the present invention, but a reduction of the average particle diameter is technically difficult and increases the production cost, and therefore, from a practical point of view, the average particle diameter of the rubber latex particles is preferably 0.01 μm or more. Meanwhile, when the average particle diameter of the rubber latex particles is more than 1.0 μm, the rubber latex component disadvantageously suffers aggregation in the adhesion treatment liquid, so that the adhesion treatment liquid becomes ununiform, and the film formed from the adhesion treatment liquid on the surface of the fiber cord has poor uniformity.

In the invention, it is preferred that the average particle diameter of the rubber latex particles in the water dispersion of the rubber latex incorporated into the adhesion treatment liquid is equivalent to the average particle diameter of the thermoplastic elastomer particles in the water dispersion of the thermoplastic elastomer incorporated into the adhesion treatment liquid. The wording "the average particle diameter of the rubber latex particles . . . is equivalent to the average particle diameter of the thermoplastic elastomer particles" means that the average particle diameter of the rubber latex in the water dispersion is preferably 0.5 to 1.5 times, further preferably 0.5 to 1.4 times, especially preferably 0.6 to 1.3 times the average particle diameter of the thermoplastic elastomer in the water dispersion. When these average particle diameters are equivalent to each other, high heat-resistance bonding force or high-temperature bonding force can be achieved.

[Adhesion Treatment Liquid]

The adhesion treatment liquid is a water dispersion containing the above-mentioned thermoplastic elastomer, blocked polyisocyanate, and rubber latex as a solids component. The content of the total of solids of the thermoplastic elastomer, blocked polyisocyanate, and rubber latex in the adhesion treatment liquid is preferably 1 to 35% by weight, further preferably 2 to 30% by weight, especially preferably 5 to 25% by weight. When the solids content is less than 1% by weight, the amount of the adhesion treatment liquid applied in the application treatment is disadvantageously reduced, leading to a lowering of the adhesion. On the other hand, when the solids content is more than 35% by weight, the amount of the solids applied to the fiber cord in the application treatment disadvantageously tends to be so large that the resultant fiber becomes hard, causing the fatigue resistance to be poor.

The adhesion treatment liquid used in the invention does not contain any of resorcin, formalin, and a condensation compound of resorcin and formalin.

[Fiber Cord]

In the invention, the fiber cord is obtained by twisting a synthetic fiber or an inorganic fiber, preferably obtained by twisting a synthetic fiber. For example, the fiber cord can be obtained by putting together the desired number of yarns of a synthetic fiber or an inorganic fiber and subjecting the yarns to first twisting, and then putting together the desired number of the first-twisted fibers and subjecting the fibers to final twisting in the direction opposite to the direction of first twisting. The number of twist is arbitrary, but generally, the number of twist in first twisting is larger than that in final twisting.

Examples of synthetic fibers include a polyester fiber, a polyamide fiber, an aromatic polyamide fiber, a rayon fiber, and a vinylon fiber, and especially preferred are a polyester fiber and an aromatic polyamide fiber.

With respect to the polyester fiber, preferred is a fiber formed from a polyester having terephthalic acid or naphthalenedicarboxylic acid as a main acid component and having ethylene glycol, 1,3-propanediol, or tetramethylene glycol as a main glycol component.

With respect to the aromatic polyamide fiber, preferred is a so-called aramid fiber formed from poly(para-aminobenzamide), poly(para-phenylene-terephthalamide), poly(para-aminobenzhydrazide terephthalamide), poly(terephthalic hydrazide), poly(meta-phenyleneisophthalamide), or a copolymer thereof. Of these, a para-type aramid fiber having especially high tenacity is preferred. With respect to the synthetic fiber, the denier, number of filaments, and cross-sectional form are arbitrary.

Examples of inorganic fibers include a carbon fiber and a glass fiber, and a carbon fiber is preferably used.

[Application Treatment]

The thermoplastic elastomer, blocked polyisocyanate, and rubber latex are applied to a fiber cord by applying the adhesion treatment liquid to the fiber cord. The application of the adhesion treatment liquid to a fiber cord can be conducted by, for example, permitting a roller having applied the adhesion treatment liquid to be in contact with a fiber cord, spraying the adhesion treatment liquid from a nozzle to a fiber cord, or immersing a fiber cord in the adhesion treatment liquid.

The amount of the adhesion treatment liquid applied to the fiber cord is preferably 0.1 to 20% by weight, further preferably 0.3 to 18% by weight, especially preferably 0.5 to 16% by weight, based on the weight of the fiber cord obtained after the application, in terms of the amount of the total of solids of the thermoplastic elastomer, blocked polyisocyanate, and rubber latex applied. The amount of the solids applied to the fiber cord can be controlled by using a method, such as squeezing by means of a pressure roller, scraping by means of a scraper or the like, blowing away by air blowing, or suction.

When the synthetic fiber used in the fiber cord is a polyester fiber or an aramid fiber, it is preferred that the fiber cord is pretreated with a pretreatment agent containing a polyepoxide compound.

EXAMPLES

Hereinbelow, the present invention will be described in more detail with reference to the following Examples. In the following Examples, the cord peel bonding force was determined by the measurement method described below.

(1) Cord Peel Bonding Force (Initial Bonding Force, Heat-Resistance Bonding Force, and High-Temperature Bonding Force)

(1-1) Cord Peel Bonding Force in the Case where the Cord is a Synthetic Fiber

The cord peel bonding force indicates a bonding force between a fiber cord and a rubber.

Three fiber cords (length: 22 cm) to be evaluated were buried in a carcass-blend unvulcanized rubber sheet (22 cm×2.5 cm; thickness: 0.4 cm) having a natural rubber as a main component so that the surface of the fiber cords was not seen by the surface of the rubber sheet, and vulcanized under a press pressure of 50 kg/cm$^2$ at a temperature of 150° C. for 30 minutes to prepare a test specimen for evaluating an initial bonding force. The resultant sheet was further vulcanized under a press pressure of 50 kg/cm$^2$ t a temperature of 180° C. for 40 minutes to prepare a test specimen for evaluating a heat-resistance bonding force. With respect to each of the test specimen for evaluating an initial bonding force and the test specimen for evaluating a heat-resistance bonding force, a peel test was conducted in an atmosphere at 20° C. to measure an initial bonding force and a heat-resistance bonding force. Further, with respect to the test specimen for evaluating an initial bonding force, a peel test was conducted in an atmosphere at 150° C. in a thermostatic chamber to measure a high-temperature bonding force.

In the peel test, using a universal testing machine, manufactured by Instron Corporation, one end of the three fiber cords to be evaluated was captured by a flat chuck, and a force required when peeling was made so that an angle between the rubber sheet and the fiber cords was 90° was measured. In this measurement, an average of values of the peel force at a peel distance of 16 cm was determined as a bonding force.

(1-2) Cord Peel Bonding Force in the Case where the Cord is a Carbon Fiber

The measurement was conducted by substantially the same method as in the item (1-1) above except that, instead of the unvulcanized rubber sheet, an unvulcanized rubber having an urethane rubber as a main component was used.

(2) Average Particle Diameter of Particles in a Water Dispersion (2-1) Measurement by Means of Microtrac Particle Size Distribution Measurement Apparatus The measurement was conducted using Microtrac particle size distribution measurement apparatus, manufactured by Leeds & Northrup Co.

(2-2) Measurement by Means of a Laser Diffraction/Scattering Particle Size Distribution Measurement Apparatus The measurement was conducted using a laser diffraction/scattering particle size distribution measurement apparatus, manufactured by MicrotracBEL Corp. In the measurement, a water dispersion which had been diluted with water so as to have a solids content of 5% by weight was subjected to measurement.

(3) Viscosity of a Water Dispersion

Using Tuning Fork Vibro Viscometer, manufactured by A&D Company, Limited, a viscosity was measured at a temperature of 20° C.

Example 1

A polyepoxide compound having a sorbitol polyglycidyl ether structure (Denacol EX-614B, manufactured by Nagase Chemtex Corporation) was dissolved in an aqueous alkali solution, and then the resultant solution, a Vp latex (manufactured by Nippon A&L Inc.; trade name: PYRATEX), and a blocked polyisocyanate (manufactured by Dai-ichi Kogyo Seiyaku Co., Ltd.; trade name: F8894ENB) were mixed in this order in a weight ratio of 10:75:50, in terms of the weight of the solids, to prepare a composition having a total solids content of 4% by weight. The prepared composition was used as a pretreatment liquid for first bath treatment (treatment liquid 1).

A thermoplastic elastomer which is a copolymer of polybutadiene and polyurethane (manufactured by Dai-ichi Kogyo Seiyaku Co., Ltd., F2471D-2; water dispersion), a blocked polyisocyanate (manufactured by Meisei Chemical Works, Ltd., DM6400; water dispersion having diphenylmethanebis-4,4'-carbamoyl-ε-caprolactam as a component), and a Vp latex (manufactured by Zeon Corporation; trade name: 2518FS; water dispersion) were mixed in a weight ratio of 50:15:50, in terms of the weight of the solids, to prepare an adhesion treatment liquid (treatment liquid 2) having a total solids content of 20% by weight. The average particle diameter of the thermoplastic elastomer in the water dispersion of the thermoplastic elastomer was 0.11 μm (value measured by the measurement method of 2-1) and 0.14 μm (value measured by the measurement method of 2-2), the viscosity of the water dispersion was 500 mPa·s (20° C.), and the pH of the water dispersion was 6.6. The average particle diameter of the Vp latex in the water dispersion of the Vp latex was 0.10 μm (value measured by the method of 2-2).

Using a multifilament yarn at 1,670 dtex/384 filaments as a polyester fiber (PET, manufactured by Teijin Limited), the yarn was subjected to first twisting at 40 T/10 cm, and then subjected to final twisting at 40 T/cm to obtain a fiber cord. Using Computreater treatment machine (manufactured by C. A. Litzler Co., Inc.; tire cord treatment machine), the obtained fiber cord was immersed in the above-prepared pretreatment liquid (treatment liquid 1), and then dried at a temperature of 150° C. for 2 minutes, and subsequently subjected to heat treatment at a temperature of 240° C. for one minute, and then immersed in the adhesion treatment liquid (treatment liquid 2) and then dried at a temperature of 170° C. for 2 minutes, and subsequently subjected to heat treatment at a temperature of 240° C. for one minute to obtain a fiber for reinforcing rubber (rubber-reinforcing fiber).

In the obtained rubber-reinforcing fiber, the thermoplastic elastomer, blocked polyisocyanate, and rubber latex in the adhesion treatment liquid were applied in an amount of 5% by weight, in terms of the total amount of the solids (based on the total weight of the rubber-reinforcing fiber obtained after the application). With respect to the obtained rubber-reinforcing fiber, a cord peel bonding force was evaluated. The results are shown in Table 1.

TABLE 1

| | Fiber cord | Initial bonding force (N/3 Cords) | Heat-resistance bonding force (N/3 Cords) | High-temperature bonding force (N/3 Cords) |
|---|---|---|---|---|
| Example 1 | Polyester fiber | 70 | 24 | 24 |
| Example 2 | Para-aramid fiber | 60 | 40 | 20 |
| Comparative Example 1 | Polyester fiber | 70 | 22 | 20 |
| Comparative Example 2 | Para-aramid fiber | 60 | 40 | 20 |
| Comparative Example 3 | Polyester fiber | 68 | 21 | 21 |
| Comparative Example 4 | Polyester fiber | 68 | 21 | 21 |
| Comparative Example 5 | Para-aramid fiber | 55 | 35 | 15 |
| Example 3 | Nylon fiber | 70 | 60 | 20 |
| Example 4 | Rayon fiber | 85 | 80 | 10 |
| Comparative Example 6 | Nylon fiber | 65 | 60 | 20 |
| Comparative Example 7 | Rayon fiber | 70 | 50 | 10 |
| Comparative Example 8 | Nylon fiber | 65 | 55 | 15 |
| Comparative Example 9 | Rayon fiber | 80 | 75 | 8 |
| Example 5 | Carbon fiber | 50 | | |
| Comparative Example 10 | Carbon fiber | 40 | | |

Example 2

The same pretreatment liquid (treatment liquid 1) and adhesion treatment liquid (treatment liquid 2) as used in Example 1 were used. Using a multifilament yarn at 1,680 dtex/1,000 filaments as an aramid fiber (manufactured by Teijin Aramid B.V.; trade name: Twaron), the yarn was subjected to first twisting at 30 T/10 cm, and then subjected to final twisting at 30 T/cm to obtain a fiber cord.

Using Computreater treatment machine (manufactured by C. A. Litzler Co., Inc.; tire cord treatment machine), the obtained fiber cord was immersed in the above-prepared pretreatment liquid (treatment liquid 1), and then dried at a temperature of 150° C. for 2 minutes, and subsequently subjected to heat treatment at a temperature of 240° C. for one minute, and then immersed in the adhesion treatment liquid (treatment liquid 2) and then dried at a temperature of 170° C. for 2 minutes, and subsequently subjected to heat treatment at a temperature of 240° C. for one minute.

In the obtained rubber-reinforcing fiber, the thermoplastic elastomer, blocked polyisocyanate, and rubber latex in the adhesion treatment liquid were applied in an amount of 5% by weight, in terms of the total amount of the solids (based on the total weight of the rubber-reinforcing fiber obtained after the application). With respect to the obtained rubber-reinforcing fiber, a cord peel bonding force was evaluated. The results are shown in Table 1.

Comparative Example 1

The same pretreatment liquid (treatment liquid 1) as used in Example 1 was used. An initial condensation product having a resorcin/formalin (R/F) molar ratio of 1/0.6 and having a solids content of 65% by weight was dissolved under alkaline conditions to obtain a 9% by weight water dispersion. 109 Parts by weight of the obtained water dispersion was added to 180 parts by weight of a 40% by weight water dispersion of a vinylpyridine-styrene-butadiene terpolymer latex. To the resultant mixture were added 5 parts by weight of formalin and parts by weight of a 33% by weight methyl ethyl ketoxime-blocked phenylmethane diisocyanate dispersion (dispersing medium:water), and the resultant mixture was matured for 48 hours to obtain a composition having a total solids content of 18% by weight, and the obtained composition was used as an adhesion treatment liquid (treatment liquid 2). Substantially the same procedure as in Example 1 was conducted except that the above-obtained adhesion treatment liquid (treatment liquid 2) was used. With respect to the obtained rubber-reinforcing fiber, a cord peel bonding force was evaluated. The results of the evaluation are shown in Table 1.

From a comparison made between Comparative Example 1 and Example 1, it is apparent that, despite using no condensation compound of resorcin and formalin, Example 1 has a bonding force equivalent to that obtained in Comparative Example 1 using a condensation compound of resorcin and formalin.

Comparative Example 2

This example is an example in which a treatment liquid containing a condensation compound of resorcin and formalin was used as the adhesion treatment liquid (treatment liquid 2).

The same pretreatment liquid (treatment liquid 1) and adhesion treatment liquid (treatment liquid 2) as used in Comparative Example 1 were used. Substantially the same procedure as in Comparative Example 1 was conducted except that the same aramid fiber as in Example 2 was used as a fiber. The results of the evaluation are shown in Table 1. From a comparison made between Comparative Example 2 and Example 2, it is apparent that, despite using no condensation compound of resorcin and formalin, Example 2 has a bonding force equivalent to that obtained in Comparative Example 2 using a condensation compound of resorcin and formalin.

Comparative Example 3

The same pretreatment liquid (treatment liquid 1) as used in Example 1 was used. A thermoplastic elastomer which is a copolymer of polybutadiene and polyurethane (water dispersion), a blocked polyisocyanate (manufactured by Meisei Chemical Works, Ltd., DM6400; water dispersion having diphenylmethanebis-4,4'-carbamoyl-ε-caprolactam as a component), and a Vp latex (manufactured by Zeon Corporation; trade name: 2518FS; water dispersion) were mixed in a weight ratio of 50:15:50, in terms of the weight of the solids, to prepare an adhesion treatment liquid (treatment liquid 2) having a total solids content of 20% by weight. The average particle diameter of the thermoplastic elastomer in the water dispersion of the thermoplastic elastomer was 1.2 μm (value measured by the method of 2-2), the viscosity of the water dispersion was 500 mPa·s (20° C.), and the pH of the water dispersion was 6.6. The average particle diameter of the Vp latex in the water dispersion of the Vp latex was 0.10 μm (value measured by the method of 2-2).

Using a multifilament yarn at 1,670 dtex/384 filaments as a polyester fiber (PET, manufactured by Teijin Limited), the yarn was subjected to first twisting at 40 T/10 cm, and then subjected to final twisting at 40 T/cm to obtain a fiber cord.

Using Computreater treatment machine (manufactured by C. A. Litzler Co., Inc.; tire cord treatment machine), the obtained fiber cord was immersed in the pretreatment liquid (treatment liquid 1), and then dried at a temperature of 150° C. for 2 minutes, and subsequently subjected to heat treatment at a temperature of 240° C. for one minute, and then immersed in the adhesion treatment liquid (treatment liquid 2) and then dried at a temperature of 170° C. for 2 minutes, and subsequently subjected to heat treatment at a temperature of 240° C. for one minute to obtain a rubber-reinforcing fiber.

In the obtained rubber-reinforcing fiber, the thermoplastic elastomer, blocked polyisocyanate, and rubber latex in the adhesion treatment liquid were applied in an amount of 5% by weight, in terms of the total amount of the solids (based on the total weight of the rubber-reinforcing fiber obtained after the application). With respect to the obtained rubber-reinforcing fiber, a cord peel bonding force was evaluated. The results are shown in Table 1.

Comparative Example 4

The same pretreatment liquid (treatment liquid 1) as used in Example 1 was used. A thermoplastic elastomer which is a copolymer of polybutadiene and polyurethane (water dispersion), a blocked polyisocyanate (manufactured by Meisei Chemical Works, Ltd., DM6400; water dispersion having diphenylmethanebis-4,4'-carbamoyl-ε-caprolactam as a component), and a Vp latex (manufactured by Zeon Corporation; trade name: 2518FS; water dispersion) were mixed in a weight ratio of 50:15:50, in terms of the weight of the solids, to prepare an adhesion treatment liquid (treatment liquid 2) having a total solids content of 20% by weight. The average particle diameter of the thermoplastic elastomer in the water dispersion of the thermoplastic elastomer was 0.11 μm (value measured by the method of 2-2), the viscosity of the water dispersion was 900 mPa·s (20° C.), and the pH of the water dispersion was 6.6. The average particle diameter of the Vp latex in the water dispersion of the Vp latex was 0.10 μm (value measured by the method of 2-2).

Using a multifilament yarn at 1,670 dtex/384 filaments as a polyester fiber (PET, manufactured by Teijin Limited), the yarn was subjected to first twisting at 40 T/10 cm, and then subjected to final twisting at 40 T/cm to obtain a fiber cord.

Using Computreater treatment machine (manufactured by C. A. Litzler Co., Inc.; tire cord treatment machine), the obtained fiber cord was immersed in the pretreatment liquid (treatment liquid 1), and then dried at a temperature of 150° C. for 2 minutes, and subsequently subjected to heat treatment at a temperature of 240° C. for one minute, and then immersed in the adhesion treatment liquid (treatment liquid 2) and then dried at a temperature of 170° C. for 2 minutes, and subsequently subjected to heat treatment at a temperature of 240° C. for one minute to obtain a rubber-reinforcing fiber.

In the obtained rubber-reinforcing fiber, the thermoplastic elastomer, blocked polyisocyanate, and rubber latex in the adhesion treatment liquid were applied in an amount of 5% by weight, in terms of the total amount of the solids (based on the total weight of the rubber-reinforcing fiber obtained after the application). With respect to the obtained rubber-reinforcing fiber, a cord peel bonding force was evaluated. The results are shown in Table 1.

Comparative Example 5

Substantially the same procedure as in Example 2 was conducted except that the average particle diameter of the thermoplastic elastomer in the water dispersion of the thermoplastic elastomer used in the adhesion treatment liquid (treatment liquid 2) was 1.2 μm (value measured by the method of 2-2).

Example 3

A thermoplastic elastomer which is a copolymer of polybutadiene and polyurethane (manufactured by Dai-ichi Kogyo Seiyaku Co., Ltd., F2471D-2; water dispersion), a blocked polyisocyanate (manufactured by Meisei Chemical Works, Ltd., DM6400; water dispersion having diphenylmethanebis-4,4'-carbamoyl-ε-caprolactam as a component), and a Vp latex (manufactured by Zeon Corporation; trade name: 2518FS; water dispersion) were mixed in a weight ratio of 50:15:50, in terms of the weight of the solids, to prepare a treatment liquid A having a total solids content of 20% by weight. The average particle diameter of the thermoplastic elastomer in the water dispersion of the thermoplastic elastomer was 0.14 μm (value measured by the method of 2-2), the viscosity of the water dispersion was 500 mPa·s (20° C.), and the pH of the water dispersion was 6.6. The average particle diameter of the Vp latex in the water dispersion of the Vp latex was 0.10 μm (value measured by the method of 2-2).

Then, a polyepoxide compound having a sorbitol polyglycidyl ether structure (Denacol EX-614B, manufactured by Nagase Chemtex Corporation) was dissolved in an aqueous solution using a stirrer, and then a blocked polyisocyanate (manufactured by Dai-ichi Kogyo Seiyaku Co., Ltd.; trade name: F8894ENB; water dispersion) was incorporated into the resultant solution to prepare a composition having a total solids content of 16% by weight (the weight ratio of the polyepoxide compound and the blocked polyisocyanate is 1:1.8, in terms of the weight of the solids). The prepared composition was slowly added to the above-mentioned treatment liquid A so that the total solids content finally became 25% by weight, obtaining an adhesion treatment liquid B.

Using a multifilament yarn at 1,400 dtex (manufactured by Asahi Kasei Corporation) as a nylon fiber, the yarn was subjected to first twisting at 40 T/10 cm, and then subjected to final twisting at 40 T/cm to obtain a fiber cord. Using Computreater treatment machine (manufactured by C. A. Litzler Co., Inc.; tire cord treatment machine), the obtained fiber cord was immersed in the above-prepared adhesion treatment liquid B, and then dried at a temperature of 150° C. for 2 minutes, and subsequently subjected to heat treatment at a temperature of 230° C. for one minute to obtain a rubber-reinforcing fiber.

In the obtained rubber-reinforcing fiber, the thermoplastic elastomer, blocked polyisocyanate, rubber latex, and polyepoxide compound in the adhesion treatment liquid B were applied in an amount of 5% by weight, in terms of the total amount of the solids (based on the total weight of the rubber-reinforcing fiber obtained after the application). With respect to the obtained rubber-reinforcing fiber, a cord peel bonding force was evaluated. The results are shown in Table 1.

Example 4

The treatment liquid A used in Example 3 above was used as the adhesion treatment liquid A.

Using a multifilament yarn at 1,840 dtex (manufactured by Cordenka GmbH & Co KG) as a rayon fiber, the yarn was subjected to first twisting at 40 T/10 cm, and then subjected to final twisting at 40 T/cm to obtain a fiber cord. Using Computreater treatment machine (manufactured by C. A. Litzler Co., Inc.; tire cord treatment machine), the obtained fiber cord was immersed in the adhesion treatment liquid A, and then dried at a temperature of 150° C. for 2 minutes, and subsequently subjected to heat treatment at a temperature of 180° C. for 2 minutes to obtain a rubber-reinforcing fiber.

In the obtained rubber-reinforcing fiber, the thermoplastic elastomer, blocked polyisocyanate, and rubber latex in the adhesion treatment liquid A were applied in an amount of 5% by weight, in terms of the total amount of the solids (based on the total weight of the rubber-reinforcing fiber obtained after the application). With respect to the obtained rubber-reinforcing fiber, a cord peel bonding force was evaluated. The results are shown in Table 1.

Comparative Example 6

This example is an example in which a treatment liquid containing a condensation compound of resorcin and formalin was used as the adhesion treatment liquid.

Resorcin and formalin were subjected to reaction under alkaline conditions for 24 hours so that the resorcin/formalin (R/F) molar ratio became 1/2 to obtain a water dispersion of a resorcin/formalin resin having a solids content of 5.7% by weight. 427 Parts by weight of the obtained water dispersion was added to 331 partsbyweight ofa 40% byweight water dispersion of a vinylpyridine-styrene-butadiene terpolymer latex. The resultant mixture was stirred for 30 minutes, and then water was further added to the mixture so that the total solids content became 17% by weight, obtaining an adhesion treatment liquid containing a condensation compound of resorcin and formalin. Substantially the same procedure as in Example 3 was conducted except that the above-obtained adhesion treatment liquid was used as an adhesion treatment liquid B.

Comparative Example 7

This example is an example in which a treatment liquid containing a condensation compound of resorcin and formalin was used as the adhesion treatment liquid.

Resorcin and formalin were subjected to reaction under alkaline conditions for 24 hours so that the resorcin/formalin (R/F) molar ratio became 1/2 to obtain a water dispersion of a resorcin/formalin resin having a solids content of 5.4% by weight. 590 Parts by weight of the obtained water dispersion was added to 410 partsbyweight ofa 40% byweight water dispersion of a vinylpyridine-styrene-butadiene terpolymer latex. The resultant mixture was allowed to stand for 4 hours, and then water was further added to the mixture so that the total solids content became 15% by weight, obtaining an adhesion treatment liquid containing a condensation compound of resorcin and formalin. Substantially the same procedure as in Example 4 was conducted except that the above-obtained adhesion treatment liquid was used as an adhesion treatment liquid A.

Comparative Example 8

Substantially the same procedure as in Example 3 was conducted except that the average particle diameter of the thermoplastic elastomer in the water dispersion of the thermoplastic elastomer used in the adhesion treatment liquid B was 1.2 μm (value measured by the method of 2-2).

Comparative Example 9

Substantially the same procedure as in Example 4 was conducted except that the average particle diameter of the thermoplastic elastomer in the water dispersion of the thermoplastic elastomer used in the adhesion treatment liquid A was 1.2 μm (value measured by the method of 2-2).

Example 5

A polyepoxide compound having a sorbitol polyglycidyl ether structure (Denacol EX-614B, manufactured by Nagase Chemtex Corporation) was dissolved in an aqueous alkali solution, and then the resultant solution, a Vp latex (manufactured by Nippon A&L Inc.; trade name: PYRATEX), and a blocked polyisocyanate (manufactured by Dai-ichi Kogyo Seiyaku Co., Ltd.; trade name: F8894ENB) were mixed in this order in a weight ratio of 10:75:50, in terms of the weight of the solids, to prepare a composition having a total solids content of 4% by weight. The prepared composition was used as a pretreatment liquid for first bath treatment (treatment liquid 1).

A thermoplastic elastomer which is a copolymer of polybutadiene and polyurethane (manufactured by Dai-ichi Kogyo Seiyaku Co., Ltd., F2471D-2; water dispersion), a blocked polyisocyanate (manufactured by Meisei Chemical Works, Ltd., DM6400; water dispersion having diphenylmethanebis-4,4'-carbamoyl-ε-caprolactam as a component), and a Vp latex (manufactured by Zeon Corporation; trade name: 2518FS; water dispersion) were mixed in a weight ratio of 50:15:50, in terms of the weight of the solids, to prepare an adhesion treatment liquid (treatment liquid 2) having a total solids content of 20% by weight. The average particle diameter of the thermoplastic elastomer in the water dispersion of the thermoplastic elastomer was 0.11 μm (value measured by the measurement method of 2-1) and 0.14 μm (value measured by the measurement method of 2-2), the viscosity of the water dispersion was 500 mPa·s (20° C.), and the pH of the water dispersion was 6.6. The average particle diameter of the Vp latex in the water dispersion of the Vp latex was 0.10 μm (value measured by the method of 2-2).

Using a multifilament yarn at 8,000 dtex/12,000 filaments (TENAX, manufactured by Teijin Limited) as a carbon fiber, the yarn was subjected to twisting at 6 T/10 cm to obtain a fiber cord. Using a plate heater, the obtained fiber cord was immersed in the above-prepared pretreatment liquid (treatment liquid 1), and then dried at a temperature of 200° C. for 2 minutes, and then immersed in the adhesion treatment liquid (treatment liquid 2) and then dried at a temperature of 240° C. for 2 minutes to obtain a rubber-reinforcing fiber. With respect to the obtained rubber-reinforcing fiber, a cord peel bonding force was evaluated, and the results of the evaluation are shown in Table 1.

Comparative Example 10

The same pretreatment liquid (treatment liquid 1) as used in Example 1 was used. An initial condensation product having a resorcin/formalin (R/F) molar ratio of 1/0.6 and having a solids content of 65% by weight was dissolved under alkaline conditions to obtain a 9% by weight water dispersion. 109 Parts by weight of the obtained water dispersion was added to 180 parts by weight of a 40% by weight water dispersion of a vinylpyridine-styrene-butadiene terpolymer latex. To the resultant mixture were added 5 parts by weight of formalin and parts by weight of a 33% by weight methyl ethyl ketoxime-blocked phenylmethane diisocyanate dispersion (dispersing medium:water), and the resultant mixture was matured for 48 hours to obtain a composition having a solids content of 18% by weight, and the obtained composition was used as an adhesion treatment liquid (treatment liquid 2). Substantially the same procedure as in Example 5 was conducted except that the above-obtained adhesion treatment liquid (treatment liquid 2) was used. With respect to the obtained rubber-reinforcing fiber, a cord peel bonding force was evaluated. The results of the evaluation are shown in Table 1.

INDUSTRIAL APPLICABILITY

A rubber-reinforcing fiber obtained by the method of the present invention for producing a fiber for reinforcing rubber can be used in reinforcing tire, hose, belt, and the like which are made of a rubber.

The invention claimed is:

1. A method for producing a fiber for reinforcing rubber, comprising applying an adhesion treatment liquid containing a thermoplastic elastomer, a blocked polyisocyanate, and a rubber latex to a fiber cord to obtain a fiber for reinforcing rubber, wherein the thermoplastic elastomer is incorporated in the form of a water dispersion into the adhesion treatment liquid, wherein the thermoplastic elastomer particles in the water dispersion have an average particle diameter of 0.01 to 1.0 µm, wherein an average particle diameter of the rubber latex in the water dispersion is 0.5 to 1.5 times the average particle diameter of the thermoplastic elastomer in the water dispersion.

2. The method for producing a fiber for reinforcing rubber according to claim 1, wherein the water dispersion has a pH of 6 to 8 and a viscosity of 100 to 800 mPa·s (20° C.).

3. The method for producing a fiber for reinforcing rubber according to claim 1, wherein the thermoplastic elastomer is a copolymer of polyurethane and polybutadiene.

4. The method for producing a fiber for reinforcing rubber according to claim 2, wherein the thermoplastic elastomer is a copolymer of polyurethane and polybutadiene.

5. The method for producing a fiber for reinforcing rubber according to claim 1, wherein the method uses none of resorcin, formalin, and a condensation compound of resorcin and formalin.

* * * * *